(12) United States Patent
Gördes

(10) Patent No.: US 11,491,683 B2
(45) Date of Patent: Nov. 8, 2022

(54) METHOD FOR PRODUCING A COMPOSITE MATERIAL

(71) Applicant: Martin Gördes, Sundern (DE)

(72) Inventor: Martin Gördes, Sundern (DE)

( * ) Notice: Subject to any disclaimer, the term of this patent is extended or adjusted under 35 U.S.C. 154(b) by 22 days.

(21) Appl. No.: 17/025,703

(22) Filed: Sep. 18, 2020

(65) Prior Publication Data

US 2021/0086396 A1    Mar. 25, 2021

(30) Foreign Application Priority Data

Sep. 20, 2019 (DE) .......................... 102019125358.6

(51) Int. Cl.
| | |
|---|---|
| *B27N 3/02* | (2006.01) |
| *C08L 97/02* | (2006.01) |
| *B27N 3/00* | (2006.01) |
| *B27N 3/18* | (2006.01) |
| *B27N 3/08* | (2006.01) |

(52) U.S. Cl.
CPC ............... *B27N 3/02* (2013.01); *B27N 3/007* (2013.01); *B27N 3/08* (2013.01); *B27N 3/18* (2013.01); *C08L 97/02* (2013.01)

(58) Field of Classification Search
CPC ............. B27N 1/00; B27N 1/02; B27N 3/007
See application file for complete search history.

(56) References Cited

U.S. PATENT DOCUMENTS

| | | | | |
|---|---|---|---|---|
| 5,279,691 A | * | 1/1994 | Stickland | B27D 1/10 144/352 |
| 5,505,238 A | * | 4/1996 | Fujii | B27L 7/00 144/346 |
| 6,895,723 B2 | * | 5/2005 | Knokey | B27N 3/007 144/347 |
| 8,188,266 B2 | * | 5/2012 | Edelmann | C08L 83/06 536/56 |
| 8,268,430 B2 | * | 9/2012 | Johnson | E04F 15/048 428/54 |

FOREIGN PATENT DOCUMENTS

| | | |
|---|---|---|
| DE | 2716748 A1 | 11/1977 |
| DE | 102006006655 A1 | 3/2007 |

* cited by examiner

*Primary Examiner* — Mary Lynn F Theisen
(74) *Attorney, Agent, or Firm* — Edell, Shapiro & Finnan, LLC

(57) ABSTRACT

A method for producing a composite material comprises the following steps: comminuting wood elements into wood fragments; crushing the wood fragments; mixing the wood fragments with an adhesive agent and/or a bonding agent; and pressing the mixture of wood fragments and the adhesive agent and/or bonding agent.

13 Claims, 1 Drawing Sheet

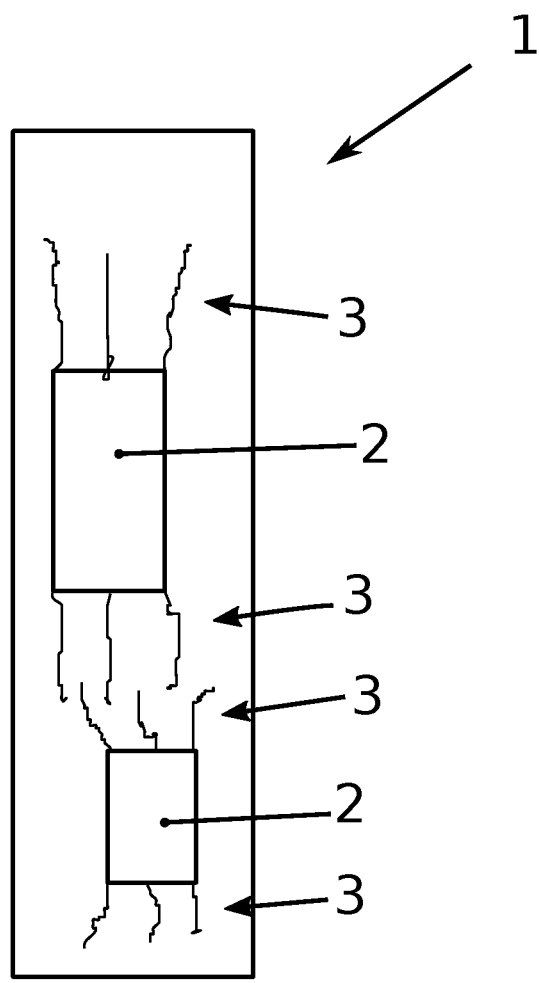

METHOD FOR PRODUCING A COMPOSITE MATERIAL

CROSS REFERENCE TO RELATED APPLICATIONS

This application claims foreign priority under 35 U.S.C. § 119(a)-(d) to Application No. DE 102019125358.6 filed on Sep. 20, 2020, the entire contents of which are hereby incorporated by reference.

TECHNICAL FIELD

The present disclosure relates to a method for producing a composite material.

BACKGROUND

Composite materials comprising wood and an adhesive agent or bonding agent are known from the prior art. In the case of chipboards, several layers of pressed virgin wood chips are bonded to one another. In so-called coarse chipboards or also OSB boards (oriented strand board) somewhat longer chips of virgin wood are used.

The patent document DE 10 2006 006 655 A1 discloses a method for producing a composite material made of various wood components and adhesive agents.

SUMMARY

In contrast to the aforementioned patent document, an object of the present invention is to provide a method with which a composite material can be produced that is not made exclusively of virgin wood. Moreover, an objective is to provide an apparatus for carrying out such a method and such a composite material.

In accordance with an example method, wood elements are initially comminuted into wood fragments. The comminution can be carried out, for example, by breaking into pieces. In this case, the wood fragments differ, for example, from wood chips in their length. The wood fragments may have, for example, a length between 5 centimeters and 2 meters.

Then, the wood fragments are crushed. The crushing can be done, for example, by passing the wood fragments between two rotating rolls. The crushing process differs, for example, from a pressing process in that the wood fragments are moved, while a force, which is directed approximately perpendicular to the direction of movement, acts on the wood fragments.

In addition, the wood fragments are mixed with an adhesive agent and/or a bonding agent. The mixture is then pressed. While pressing, the mixture can be heated, for example, to a temperature between 190° C. and 250° C., so that it is possible to use adhesive agents exhibiting an adhesive effect that assumes such a high temperature.

Depending on the adhesive agent and/or bonding agent that is/are used, the mixture can be raised to the correspondingly required temperature.

This method makes it possible to produce a composite material that is predominantly or even completely free of virgin wood. Therefore, it is possible to use wood that is not used for other composite materials, such as, for example, chipboards or OSB boards.

The composite material can be used, for example, in the form of boards, squared timber, roof laths, construction lumber, in the packaging industry or in the building industry. In the packaging industry, the composite material can be used, for example, for pallets, crates or dunnage.

In accordance with one example embodiment, the wood elements may comprise waste wood, recycled wood and/or calamity wood. For example, the wood elements may comprise wood that is not fit or hardly fit for other purposes of application because of pests, such as the bark beetle. Even wood from storm damage can be used. The composite material can consist exclusively of those types of wood mentioned in this paragraph or else can also comprise a percentage of virgin wood.

The use of waste wood, recycled wood, and/or calamity wood leads to a reduction in the emission of carbon dioxide. Because fresh wood is used in known materials, after use, the fresh wood is disposed of by thermal means. In this process carbon dioxide is released. In Germany, approximately 50 million cubic meters of wood per year are used for pallets, crates, construction lumber, and similar purposes. In this respect one, cubic meter of wood binds about one ton of carbon dioxide. If just 10% of this volume were to be replaced by the composite material, then about 5 million tons of carbon dioxide would be saved if the composite material were used just once. Since, however, the composite material can be used over and over again, the actual saving is presumably many times higher.

In accordance with one embodiment, the wood fragments can be heated, preferably to at least 56° C. In this way, a particularly good bond of the wood fragments with the adhesive agent and/or bonding agent can be achieved.

In accordance with one embodiment, the wood fragments can be heated for at least 30 minutes. This aspect also improves the bond of the wood fragments with the adhesive agent and/or bonding agent.

The treatment requirements for the export of wood under the International Standards for Phytosanitary Measures (ISPM) developed by the International Plant Protection Convention (IPPC) can also be met by raising the temperature to at least 56° C. for at least 30 minutes.

In accordance with one embodiment, the wood fragments can be splintered after crushing. In this way, the wood fragments can mesh with one another. Thus, a very high strength of the composite material can be achieved.

In the context of this description the term "splintered wood fragments" is understood to mean that the wood fragments are broken apart or split in order to achieve an intermeshing.

In accordance with one embodiment, the splintered end regions can mesh with one another during the mixing process. In the context of this description this is understood to mean that the splintered end regions of different wood fragments can mesh with one another. This aspect increases the strength of the composite material.

In accordance with one embodiment, the wood fragments can be longer than 5 centimeters prior to crushing. It is particularly possible for the composite material to be free of smaller wood fragments. The wood fragments preferably have a length of less than 2 meters. Special preference is given to wood fragments having a length between 5 and 70 centimeters, in particular, between 10 and 50 centimeters.

In accordance with one embodiment, the mixture can be brought into a sawn timber form during the pressing process. In this case, it may be the form of sawn timber in compliance with DIN 68252 or DIN 4074. In particular, the mixture can be brought into a squared timber form, plank form, board form, or lath form. For example, the mixture can have a thickness of no less than 8 and not more than 40 millimeters after the pressing process. In this case the width may be more than 80 millimeters. As an alternative, the mixture may have a thickness of more than 40 millimeters after pressing. In this case the width may be less than three times the thickness.

BRIEF DESCRIPTION OF THE DRAWINGS

Other features and advantages of the present invention shall become apparent from the following description of an example embodiment with reference to the accompanying drawing. In this case the same reference numerals are used for identical or similar components and for components with identical or similar functions.

FIG. 1 illustrates in schematic form a plan view of a composite material that is produced by a method in accordance with one embodiment of the invention.

DETAILED DESCRIPTION

Referring to FIG. 1, a composite material 1 comprises several wood fragments, each of which consists of a central region 2 and two end regions 3. The wood fragments are splintered in each case in the end regions 3, so that the end regions 3 of the adjacent wood fragments are intermeshed with one another. FIG. 1 shows only two wood fragments for reasons of clarity. In reality the number of wood fragments is many times larger.

The composite material 1 is produced by first producing wood fragments from waste wood, recycled wood, and/or calamity wood. The wood fragments are crushed such that they are splintered in the end regions 3. In addition, the wood fragments are heated and mixed with an adhesive agent and/or bonding agent. Then the mixture is pressed into a sawn timber form.

By using exclusively or predominantly waste wood, recycled wood, and/or calamity wood, the use of virgin wood can be reduced or even avoided, so that the environment is protected. In particular, in longer lasting periods of drought to be expected due to climate change, the use of virgin wood can become a problem, if, for example, sufficient virgin wood is no longer available. In addition, the volume of calamity wood due to pests such as the bark beetle is increasing, so that the composite materials can be produced cost effectively.

What is claimed is:

1. A method for producing a composite material, comprising:
   comminuting wood elements into wood fragments;
   crushing the wood fragments;
   mixing the wood fragments with an adhesive agent and/or a bonding agent to form a mixture, wherein splintered end regions of the wood fragments mesh with one another during the mixing process; and
   simultaneously pressing and heating the mixture of wood fragments having meshed splintered end regions and the adhesive agent and/or bonding agent, wherein the mixture is brought into a sawn timber form during the pressing process.

2. The method of claim 1, wherein the wood elements comprise waste wood, recycled wood, and/or calamity wood.

3. The method of claim 1, wherein the wood fragments are heated to at least 56° C.

4. The method of claim 1, wherein the wood fragments are heated for at least 30 minutes.

5. The method of claim 1, wherein, after crushing, the wood fragments are splintered.

6. The method of claim 1, wherein the wood fragments are longer than 5 centimeters prior to crushing.

7. The method of claim 1, wherein the mixture is heated to a temperature between 190° C. and 250° C. while pressing the mixture.

8. A composite material manufactured according to the method of claim 1, wherein the composite material exhibits a sawn timber form.

9. An apparatus comprising:
   a comminuter configured to comminute wood elements into wood fragments;
   a crusher configured to crush the wood fragments;
   a mixer configured to
      mix the wood fragments with an adhesive agent and/or a bonding agent to form a mixture and
      mesh splintered end regions of the wood fragments with one another; and
   a presser configured to
      simultaneously press and heat the mixture of wood fragments having meshed splintered end regions and the adhesive agent and/or bonding agent, and
      bring the mixture into a sawn timber form.

10. The apparatus according to claim 9, wherein the crusher comprises two rotating rolls.

11. The apparatus according to claim 9 further comprising a splinterer configured to splinter the wood fragments.

12. The apparatus according to claim 9, wherein the sawn timber form is at least one of a squared timber form, a plank form, a board form, or a lath form.

13. The apparatus according to claim 9, wherein the presser is configured to heat the mixture to a temperature between 190° C. and 250° C. while pressing the mixture.

* * * * *